US010464345B2

(12) United States Patent
    Okada (10) Patent No.: US 10,464,345 B2
(45) Date of Patent: Nov. 5, 2019

(54) DRYING APPARATUS, RECORDING APPARATUS, AND DRYING METHOD

(71) Applicant: SEIKO EPSON CORPORATION, Tokyo (JP)

(72) Inventor: Hideki Okada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/901,399

(22) Filed: Feb. 21, 2018

(65) Prior Publication Data

US 2018/0236784 A1   Aug. 23, 2018

(30) Foreign Application Priority Data

Feb. 22, 2017   (JP) ................................. 2017-030767

(51) Int. Cl.
| | | |
|---|---|---|
| B41J 11/00 | (2006.01) | |
| B41M 7/00 | (2006.01) | |
| B29C 37/00 | (2006.01) | |
| B29C 55/06 | (2006.01) | |
| B41J 3/407 | (2006.01) | |
| B41M 5/00 | (2006.01) | |
| B29K 27/06 | (2006.01) | |

(52) U.S. Cl.
CPC ............. *B41J 11/002* (2013.01); *B29C 37/00* (2013.01); *B29C 55/06* (2013.01); *B41J 3/407* (2013.01); *B41J 11/0005* (2013.01); *B41M 7/009* (2013.01); *B29C 2037/90* (2013.01); *B29C 2795/002* (2013.01); *B29K 2027/06* (2013.01); *B41M 5/0047* (2013.01); *B41M 5/0064* (2013.01)

(58) Field of Classification Search
CPC ...... B41J 11/002; B41J 3/407; B41J 11/0005; B29C 37/00; B29C 55/06; B29C 2795/002; B29C 2037/90; B41M 7/009; B41M 5/0047; B41M 5/0064; B29K 2027/06

See application file for complete search history.

(56) References Cited

U.S. PATENT DOCUMENTS 4,818,460 A * 4/1989 Nied ..................... B29C 51/082
                                                   264/310
6,567,112 B2 * 5/2003 Suzuki .................... B41J 35/14
                                                   347/217

FOREIGN PATENT DOCUMENTS

| JP | 2776806 B | 5/1998 |
| JP | 2005-343597 A | 12/2005 |
| JP | 2015-06458 A | 4/2015 |
| JP | 2015064548 A * | 4/2015 |
| JP | 2015-158637 A | 9/2015 |

OTHER PUBLICATIONS

IP.com search (Year: 2019).*

* cited by examiner

*Primary Examiner* — Lisa Solomon
(74) *Attorney, Agent, or Firm* — Workman Nydegger (57) ABSTRACT

A drying apparatus includes: a heating drying portion that heats and dries a thermoplastic medium to which a liquid has been applied; and a pressurizing portion that pressurizes the thermoplastic medium heated by the heating drying portion to correct a shape of the thermoplastic medium. The pressurizing portion pressurizes, while heating, the heated thermoplastic medium in accordance with a state of the thermoplastic medium deformed.

19 Claims, 5 Drawing Sheets

DRYING APPARATUS, RECORDING APPARATUS, AND DRYING METHOD

BACKGROUND

1. Technical Field

The present invention relates to a drying apparatus, a recording apparatus, and a drying method.

2. Related Art

Various drying apparatuses have been in use. Among them is a drying apparatus that heats and dries a medium to which a liquid has been applied. For example, JP-A-2015-158637 discloses an image forming apparatus (recording apparatus) that discharges ink as an example of a liquid onto paper as an example of a medium, and includes, as a drying apparatus, pressure rollers as a heating drying portion for ink. The pressure rollers heat the paper to which ink has been applied while pressurizing it.

In recent years, various types of media are used in drying apparatuses included in, for example, recording apparatuses, and for example, a thermoplastic medium is used. In the image forming apparatus described in JP-A-2015-158637, when paper is used as the medium, it may be possible to prevent or reduce deformation of the paper. However, when a thermoplastic medium is used as the medium, the deformation of the thermoplastic medium might occur due to heat of a pressure roller. That is, in the hitherto known drying apparatus that heats and dries the medium to which a liquid has been applied, when the thermoplastic medium is used as the medium, the thermoplastic medium to which a liquid has been applied may be deformed when heated and dried. Therefore, a drying apparatus capable of recovering the shape of the thermoplastic medium from deformation due to heating and drying has been desired.

SUMMARY

An advantage of some aspects of the invention is that a thermoplastic medium, deformed due to heating and drying, may be corrected.

A drying apparatus according to a first aspect of the invention includes: a heating drying portion that heats and dries a thermoplastic medium to which a liquid has been applied; and a pressurizing portion that pressurizes the thermoplastic medium heated by the heating drying portion to correct a shape of the thermoplastic medium. The pressurizing portion pressurizes, while heating, the heated thermoplastic medium in accordance with a state of the thermoplastic medium deformed.

According to the aspect, it is possible to correct the shape of the heated thermoplastic medium by pressurizing, while heating, the thermoplastic medium in accordance with the state of the thermoplastic medium deformed. That is, heating and drying the thermoplastic medium to which a liquid has been applied and correcting the shape of the thermoplastic medium are performed separately. Accordingly, the thermoplastic medium deformed due to heating and drying can be extended as a whole in accordance with a region with more extension, and the shape of the thermoplastic medium can be corrected effectively.

It is preferable that the pressurizing portion have a roller and be able to change a heating temperature in each portion of the roller different in an axial direction of the roller.

According to the above, since the pressurizing portion has a roller and is able to change a heating temperature in each portion of the roller different in the axial direction of the roller, it is possible to correct the shape of the heated thermoplastic medium while heating each portion different in the axial direction at an appropriate temperature in accordance with the state of the thermoplastic medium deformed.

It is preferable that the roller be able to change the heating temperature at a center portion and end portions in the axial direction.

In the thermoplastic medium heated by the heating drying portion, a deformation (extension) degree is liable to change between the center portion and each end portion of the thermoplastic medium in a width direction of the thermoplastic medium corresponding to the axial direction of the roller. However, according to the above, the heating temperature is changeable between the center portion and each end portion of the roller in the axial direction, thus enabling the shape of the thermoplastic medium to be corrected preferably.

It is preferable that in the roller, an external diameter of the center portion in the axial direction be larger than an external diameter of the end portions in the axial direction.

According to the above, since the external diameter of the center portion of the roller in the axial direction is larger than the external diameter of each end portion of the roller in the axial direction, extending the thermoplastic medium, deformed from the center portion to the end portions, enables the shape of the thermoplastic medium to be corrected preferably as a whole.

It is preferable that the drying apparatus further include a determination unit that determines extension of the thermoplastic medium heated by the heating drying portion, for each region of the thermoplastic medium, and that the pressurizing portion pressurizes a region with less extension in the heated thermoplastic medium at a heating temperature higher than a temperature at which a region with more extension in the heated thermoplastic medium is pressurized.

According to the above, since the pressurizing portion pressurizes a region with less extension in the heated thermoplastic medium at a heating temperature higher than a temperature at which a region with more extension in the heated thermoplastic medium is pressurized, the region with less extension is extended more than the region with more extension at the time of correction, to enable the shape of the thermoplastic medium to be corrected preferably as a whole. Note that the meaning of "determining extension of the thermoplastic medium heated by the heating drying portion, for each region of the thermoplastic medium" includes a case where a user reads the degree of extension and inputs the reading result and the determination unit determines extension on the basis of the input information, in addition to the determination being made on the basis of a result of reading performed by an extension-degree reading portion or the like provided in the drying apparatus.

It is preferable that the pressurizing portion pressurize the region with less extension while heating the region with less extension at a temperature equal to or higher than a glass transition temperature of the thermoplastic medium.

According to the above, since the region with less extension is pressurized while heated at a temperature equal to or higher than a glass transition temperature of the thermoplastic medium, the region with less extension can be effectively extended at the time of correction, thus enabling the shape of the thermoplastic medium to be corrected preferably as a whole.

It is preferable that the pressurizing portion pressurize the region with more extension while heating the region with more extension at a temperature lower than a glass transition temperature of the thermoplastic medium.

According to the above, since the region with more extension is pressurized while heated at a temperature lower than a glass transition temperature of the thermoplastic medium, the whole thermoplastic medium can be extended while further extension of the region with more extension being prevented at the time of correction, thus enabling the shape of the thermoplastic medium to be corrected preferably as a whole.

It is preferable that the heating drying portion dry the thermoplastic medium by radiant heating.

According to the above, it is possible to effectively dry the thermoplastic medium by radiant heating.

It is preferable that the heating drying portion dry the thermoplastic medium by convective heating.

According to the above, it is possible to effectively dry the thermoplastic medium by convective heating.

A recording apparatus according to a second aspect of the invention includes: a recording head capable of discharging ink as the liquid onto the thermoplastic medium; and the drying apparatus according to the first aspect of the invention.

According to the aspect, even when the thermoplastic medium recorded by the recording head is deformed due to heating and drying, the thermoplastic medium can be extended as a whole in accordance with a region with more extension, and the shape of the thermoplastic medium can be corrected effectively.

A drying method according to a third aspect of the invention includes: heating and drying a thermoplastic medium to which a liquid has been applied; and pressurizing the thermoplastic medium heated in the heating and drying to correct a shape of the thermoplastic medium. The pressurizing pressurizes, while heating, the heated thermoplastic medium in accordance with a state of the thermoplastic medium deformed.

According to the aspect, it is possible to correct the shape of the heated thermoplastic medium by pressurizing, while heating, the thermoplastic medium in accordance with the state of the thermoplastic medium deformed. That is, heating and drying of the thermoplastic medium to which a liquid has been applied and correcting the shape of the thermoplastic medium are performed separately. Accordingly, the thermoplastic medium, deformed due to heating and drying, can be extended as a whole in accordance with a region with more extension, and the shape of the thermoplastic medium can be corrected effectively.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a recording apparatus as a drying apparatus according to an aspect of the invention will be described in detail with reference to the drawings.

Figure 1:
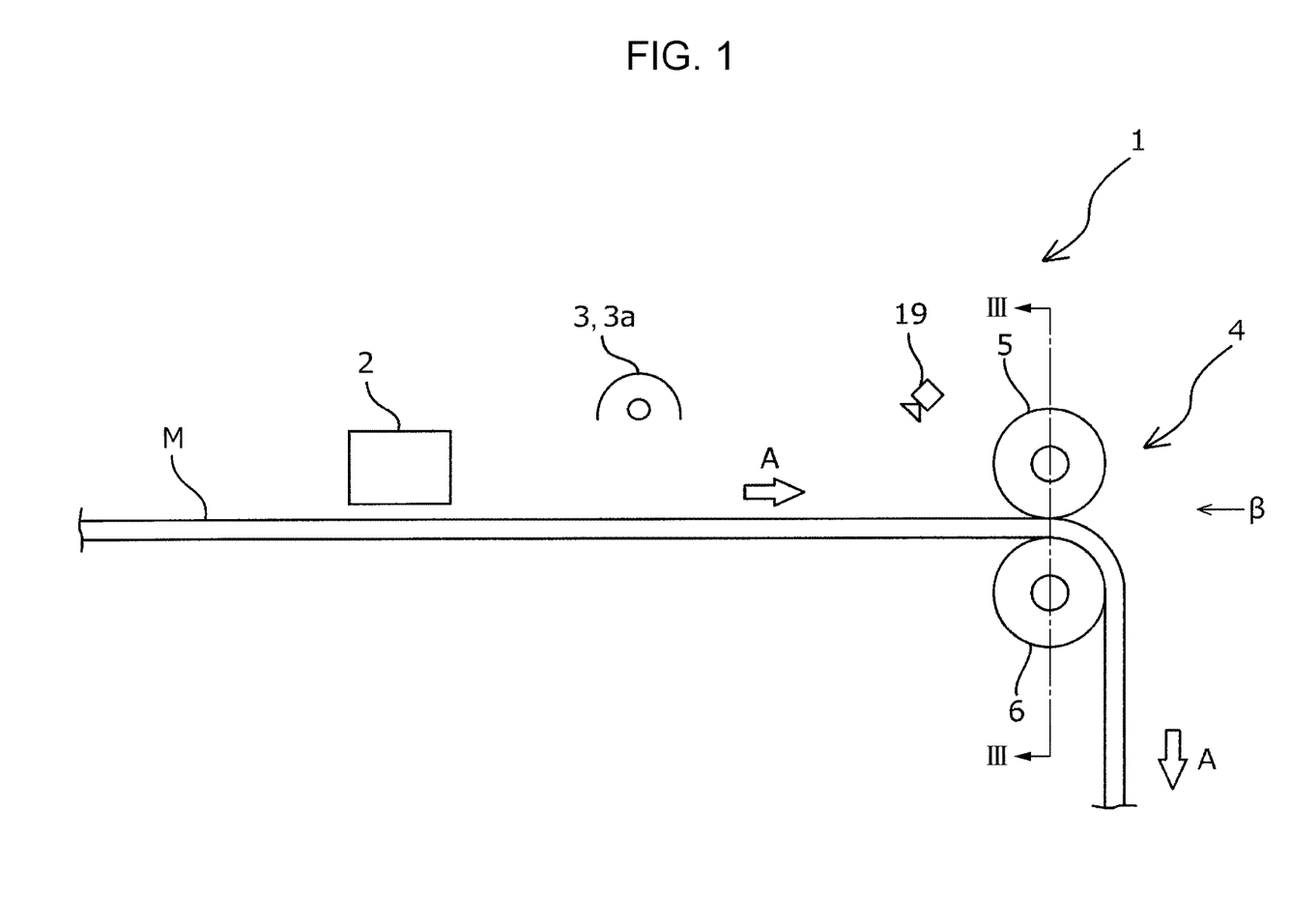
FIG. 1 is a schematic view of a recording apparatus according to a first embodiment of the invention.
Figure 2:
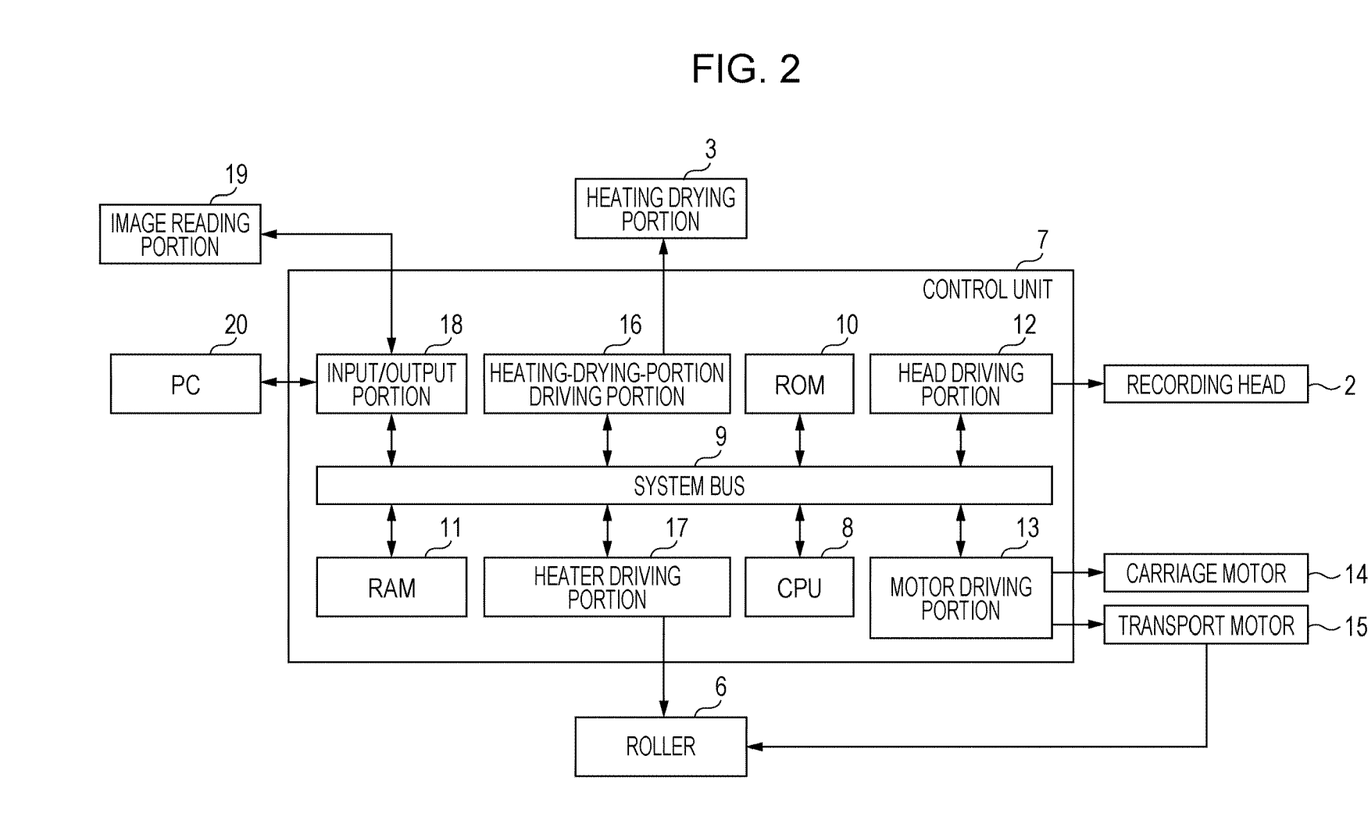
FIG. 2 is a block diagram of the recording apparatus according to the first embodiment of the invention.
Figure 3:
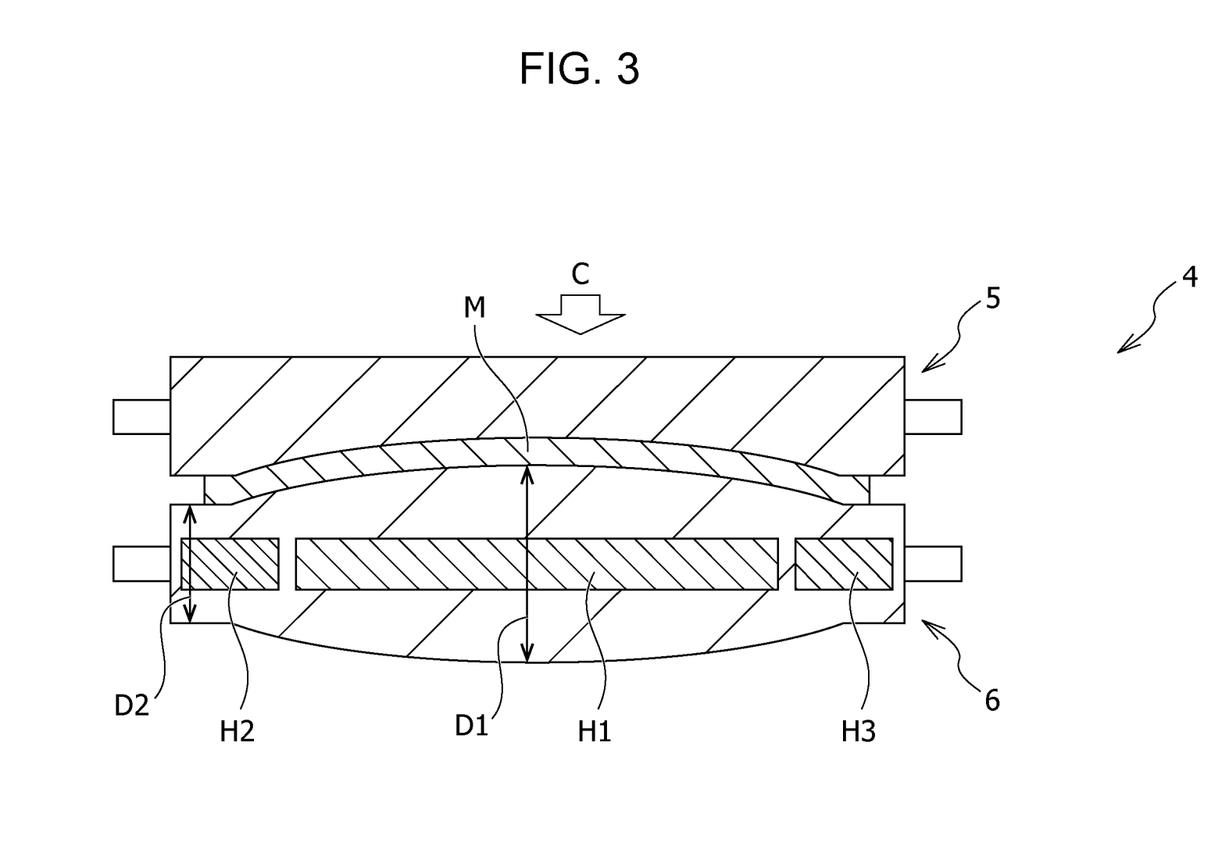
FIG. 3 is a schematic view of a main part of the recording apparatus according to the first embodiment of the invention.

First Embodiment (FIGS. 1 to 3)

First, a summary of a recording apparatus 1 according to a first embodiment of the invention will be described. FIG. 1 is a schematic view (schematic side view) of the recording apparatus 1 according to the present embodiment.

The recording apparatus 1 of the embodiment is configured to transport a long thermoplastic medium M (e.g., polyvinyl chloride sheet) in a transporting direction A by using a roller pair 4 as a transport portion, discharge ink from a recording head 2 onto the transported long thermoplastic medium M so as to form an image, heat by a heating drying portion 3 a region in which the image has been formed, and wind the thermoplastic medium M by using a winding portion, not shown, formed downstream of the roller pair 4 in the transporting direction A. Although the recording apparatus 1 of the embodiment uses a roll of the long thermoplastic medium M, the recording apparatus 1 is not limited to a recording apparatus using such a thermoplastic medium M. For example, the recording apparatus may be a recording apparatus capable of using single sheets of a thermoplastic medium M.

The recording head 2 of the embodiment is configured to discharge ink from a plurality of nozzles on a nozzle formation surface provided with the nozzles. The recording head 2 can discharge the ink from the nozzles onto the transported thermoplastic medium M for recording, while reciprocating in a transverse direction (scanning direction) which intersects with the transporting direction A of the thermoplastic medium M. By including the recording head 2 with such a configuration, the recording apparatus 1 of the embodiment can form a desired image on the thermoplastic medium M by repetition of transporting the thermoplastic medium M by a predetermined amount (for one pass) in the transporting direction A and causing the recording head 2 to discharge the ink onto the thermoplastic medium M in a halted state, while moving the recording head 2 in the scanning direction.

However, the recording apparatus is not limited to a recording apparatus with the recording head 2 having such a configuration. For example, the recording apparatus may be a recording apparatus including a so-called line head provided with a plurality of nozzles for discharging ink in the transverse direction which intersects with the transporting direction A of the thermoplastic medium M. Here, "line head" means a recording head in which a region of the nozzles, formed in the transverse direction which intersects with the transporting direction A of the thermoplastic medium M, is provided so as to be able to span the whole transverse direction, and such a recording head is used in a recording apparatus that relatively moves the recording head or the thermoplastic medium M to form an image. Note that the region of the nozzles in the transverse direction in the line head may not necessarily be able to span the transverse direction of every thermoplastic medium M that is usable in the recording apparatus.

The heating drying portion 3 of the embodiment is an infrared radiation portion 3a that irradiates the thermoplastic medium M with an electromagnetic wave (infrared rays) to dry the ink discharged from the recording head 2 onto the thermoplastic medium M. When the heating drying portion 3 is the infrared radiation portion 3a, the temperature at the time of heating a region to which ink has been applied varies depending on the color of the ink used. For example, a temperature of a region having an image formed with black ink is increased to a relatively high degree by irradiation with infrared rays, and a temperature of a region having an image formed with white ink does not become very high even by irradiation with infrared rays. Hence, in the region having an image formed with black ink, the thermoplastic medium M may be extended by irradiation with infrared rays, and in the region having an image formed with white ink, the thermoplastic medium M may not extend even by irradiation with infrared rays.

Even when the heating drying portion 3 does not have such a configuration, generally, end portions of the thermoplastic medium M in the widthwise direction (the transverse direction which intersects with the transporting direction A) tend to extend more easily than the center of the thermoplastic medium M in the widthwise direction. That is, when the thermoplastic medium M is heated, uneven extension may occur easily. When such uneven extension occurs in the thermoplastic medium M, an external appearance of the thermoplastic medium M may be spoiled, and particularly in the long thermoplastic medium M, winding and twisting may easily occur due to the uneven extension. Thus in a recording apparatus configured to wind the thermoplastic medium M in a winding portion, such as the recording apparatus 1 of the embodiment, there may occur a winding defect, such as an increase in winding diameter or non-uniformity of winding between the ends in the widthwise direction.

Therefore, the recording apparatus 1 of the embodiment is configured such that the roller pair 4 as the transport portion can correct the uneven extension (deformation) of the thermoplastic medium M. The roller pair 4 of the embodiment is made up of a roller 5 and a roller 6 as illustrated in FIG. 1. The roller pair 4 is a main part of the recording apparatus 1 of the embodiment and also serves as the pressurizing portion. The roller pair 4 will be described in detail later. Further, an image reading portion 19, described in detail later, is provided between the heating drying portion 3 and the roller pair 4 in the transporting direction A.

Next, an electrical configuration of the recording apparatus 1 of the embodiment will be described. FIG. 2 is a block diagram of the recording apparatus 1 of the embodiment. A CPU 8 for controlling the whole recording apparatus 1 is provided in a control unit 7. The CPU 8 is connected, via a system bus 9, to a ROM 10 that stores various control programs and the like to be executed by the CPU 8, and to a RAM 11 that can temporarily store data.

Further, the CPU 8 is connected, via the system bus 9, to a head driving portion 12 for driving the recording head 2.

Moreover, the CPU 8 is connected, via the system bus 9, to a motor driving portion 13 for driving a carriage motor 14 and a transport motor 15. The carriage motor 14 here is a motor for moving a carriage, not shown, onto which the recording head 2 is mounted in the scanning direction that intersects with the transporting direction A. The transport motor 15 is a motor for driving the roller 6 as a driving roller constituting the roller pair 4. Note that the roller 5 is a driven roller that is driven and rotated by rotation of the roller 6.

Further, the CPU 8 is connected, via the system bus 9, to the heating-drying-portion driving portion 16 for driving the heating drying portion 3.

Moreover, the CPU 8 is connected, via the system bus 9, to a heater driving portion 17 for driving heaters (heater H1, heater H2, and heater H3) to be mentioned later built in the roller 6.

Moreover, the CPU 8 is connected, via the system bus 9, to an input/output portion 18 that is connected to an image reading portion 19 and a PC 20 for transmitting and receiving a signal and data such as recording data.

Next, a description will be given of the roller pair 4 that is a main part of the recording apparatus 1 of the embodiment and that also serves as the pressurizing portion. FIG. 3 is a schematic view of the roller pair 4 and illustrates a state where cross section taken along a line III-III in FIG. 1 is seen in a direction β.

As illustrated in FIG. 3, the roller pair 4 of the embodiment is configured such that the roller 5 is pressed (pressurized) onto the roller 6 in a direction C to pinch (pressurize) the thermoplastic medium M by the roller 5 and the roller 6, and transports the thermoplastic medium M in the transporting direction A. The roller pair 4 is configured such that the heater H1, the heater H2, and the heater H3 are provided inside the roller 6, and the thermoplastic medium M can be pressurized while being heated by these heaters. With such a configuration, the roller pair 4 of the embodiment heats and pressurizes the thermoplastic medium M heated by the heating drying portion 3 to enable correction of the shape of the thermoplastic medium M. Note that the roller pair 4 of the embodiment is configured such that the force by which the roller 5 is pressed (pressurized) onto the roller 6 can be changed in accordance with the type of the thermoplastic medium M used or the type of the ink used.

That is, as described above, the recording apparatus 1 of the embodiment includes the heating drying portion 3 that heats and dries the thermoplastic medium M applied with ink as an example of a liquid. As illustrated in FIG. 3, the recording apparatus 1 includes the roller pair 4 that also serves as the pressurizing portion. The roller pair 4 here heats and pressurizes the thermoplastic medium M heated by the heating drying portion 3 to correct the shape thereof, and is configured to be able to pressurize the heated thermoplastic medium M while heating it by the heater H1, the heater H2, and the heater H3, in accordance with the state of the heated thermoplastic medium M deformed. That is, the recording apparatus 1 of the embodiment can separately perform heating and drying of the thermoplastic medium M to which a liquid has been applied and correction of the shape of the thermoplastic medium M. Having such a configuration, the recording apparatus 1 of the embodiment is configured to be able to extend the thermoplastic medium M deformed due to heating and drying by the heating drying portion 3 as a whole in accordance with a region with more extension, thus effectively correcting the thermoplastic medium M.

To put it another way, it is possible to perform a drying method by using the recording apparatus 1 of the embodiment, the method including: heating and drying the thermoplastic medium M applied with ink (liquid); and pressurizing, while heating, the thermoplastic medium M heated in the heating and drying, in accordance with the state of the thermoplastic medium M deformed, to correct the shape of the thermoplastic medium M. By performing the drying method in which the heating and drying of the thermoplastic medium M to which a liquid has been applied and the correction of the shape of the thermoplastic medium M are separately performed, it is possible to extend the thermoplastic medium M, deformed due to heating and drying, as a whole in accordance with a region with more extension, thus the shape of the thermoplastic medium M being effectively corrected.

To put it still another way, the recording apparatus 1 of the embodiment includes: the recording head 2 capable of discharging ink as an example of a liquid onto the thermoplastic medium M; the heating drying portion 3; and the roller pair 4 that also serves as the pressurizing portion. Accordingly, even when the thermoplastic medium M onto which recording has been performed by the recording head 2 is deformed due to heating and drying, the thermoplastic medium M can be extended as a whole in accordance with a region with more extension, and the shape of the thermoplastic medium M can be corrected effectively.

Further, the recording apparatus 1 of the embodiment is configured such that the heater H1, the heater H2, and the heater H3 can be controlled separately each with a different temperature, by control of the control unit 7. That is, the roller pair 4 of the embodiment includes the roller 6 and is able to change the heating temperature in each portion of the roller 6 different in the axial direction. Accordingly, the recording apparatus 1 of the embodiment is configured to be able to correct the shape of the thermoplastic medium M heated in the heating drying portion 3 in accordance with the state of the thermoplastic medium M deformed, while heating each portion different in the axial direction to an appropriate temperature.

To put it another way, the roller 6 is able to change the heating temperature at the center portion (a region corresponding to the heater H1) and the end portions (regions corresponding to the heater H2 and the heater H3) in the axial direction. In the thermoplastic medium M heated by the heating drying portion 3, a deformation (extension) degree is liable to change between the center portion and each end portion of the thermoplastic medium M in the width direction of the thermoplastic medium M corresponding to the axial direction of the roller 6. However, according to the recording apparatus 1 of the embodiment, the heating temperature is changeable between the center portion and each end portion of the roller 6 in the axial direction, thus enabling the shape of the thermoplastic medium M to be corrected preferably.

Further, as illustrated in FIG. 3, the roller 6 of the embodiment is a so-called crown roller where an external diameter D1 of the center portion of the roller 6 in the axial direction is larger than an external diameter D2 of each end portion of the roller 6 in the axial direction. Thus, extending the thermoplastic medium M deformed from the center portion to each end portion enables the shape of the thermoplastic medium M to be corrected preferably as a whole. Although a constituent material for the roller 6 and the roller 5 is not particularly limited, these rollers are preferably made of a material harder than the thermoplastic medium M.

As illustrated in FIGS. 1 and 2, the recording apparatus 1 of the embodiment includes the image reading portion 19, and the image reading portion 19 can read an image on the thermoplastic medium M for each region of a predetermined size. As the determination portion, the control unit 7 can input the image read in the image reading portion 19 and determines the extension of the thermoplastic medium M heated by the heating drying portion 3 for each region of the thermoplastic medium M. The heater H1, the heater H2, and the heater H3 are configured to be able to control a temperature for each further divided region. Thus, under the control of the control unit 7, the roller pair 4 can pressurize the thermoplastic medium M by increasing the heating temperature of a region with less extension in the heated thermoplastic medium M to more than that of a region with more extension in the heated thermoplastic medium M. With such a configuration, the recording apparatus 1 of the embodiment can extend the region with less extension more than the region with more extension at the time of correction of the thermoplastic medium M by the roller pair 4, to enable the shape of the thermoplastic medium M to be corrected preferably as a whole. Note that the meaning of "determining extension of the thermoplastic medium M heated by the heating drying portion 3 for each region of the thermoplastic medium M" includes a user reading the degree of extension by visual observation or the like and inputting the reading result via a PC 20 or the like so that the determination is made based on the input information, in addition to the determination being made based on a result of reading performed by an extension-degree reading portion (image reading portion 19) or the like provided in the recording apparatus 1 as in the embodiment. Further, the reading portion is made up of a temperature detection portion capable of detecting the temperature of the thermoplastic medium M, and can read a temperature distribution to determine the read distribution as a distribution of the degree of extension of the thermoplastic medium M. The "region with less extension" means a region with extension smaller than extension of the region with more extension and includes a region with substantially no extension.

In the recording apparatus 1 of the embodiment, the roller pair 4 pressurizes the region with less extension while heating the region at a temperature equal to or higher than a glass transition temperature of the thermoplastic medium M. Accordingly, the region with less extension can be effectively extended at the time of correction, thus enabling the shape of the thermoplastic medium M to be corrected preferably as a whole. Note that the recording apparatus 1 of the embodiment is configured to be able to input the glass transition temperature of the thermoplastic medium M via the PC 20 or the like. The control unit 7 can then set the heating temperature of the region with less extension based on the input glass transition temperature.

Further, in the recording apparatus 1 of the embodiment, the roller pair 4 pressurizes the region with more extension while heating the region at a temperature lower than the glass transition temperature of the thermoplastic medium M. Accordingly, the whole thermoplastic medium M can be extended to prevent further extension of the region with more extension at the time of correction, thus enabling the shape of the thermoplastic medium M to be corrected preferably as a whole. In the recording apparatus 1 of the embodiment, the control unit 7 can set the heating temperature of the region with more extension based on the input glass transition temperature.

Further, as described above, the heating drying portion 3 of the recording apparatus 1 of the embodiment is the infrared radiation portion 3a that dries the thermoplastic medium M by irradiation with an electromagnetic wave (infrared rays), in other words, by radiant heating. The infrared radiation portion 3a can effectively dry the thermoplastic medium M by radiant heating. However, the heating drying portion 3 is not limited to the configuration of drying the thermoplastic medium M by radiant heating.

Figure 4:
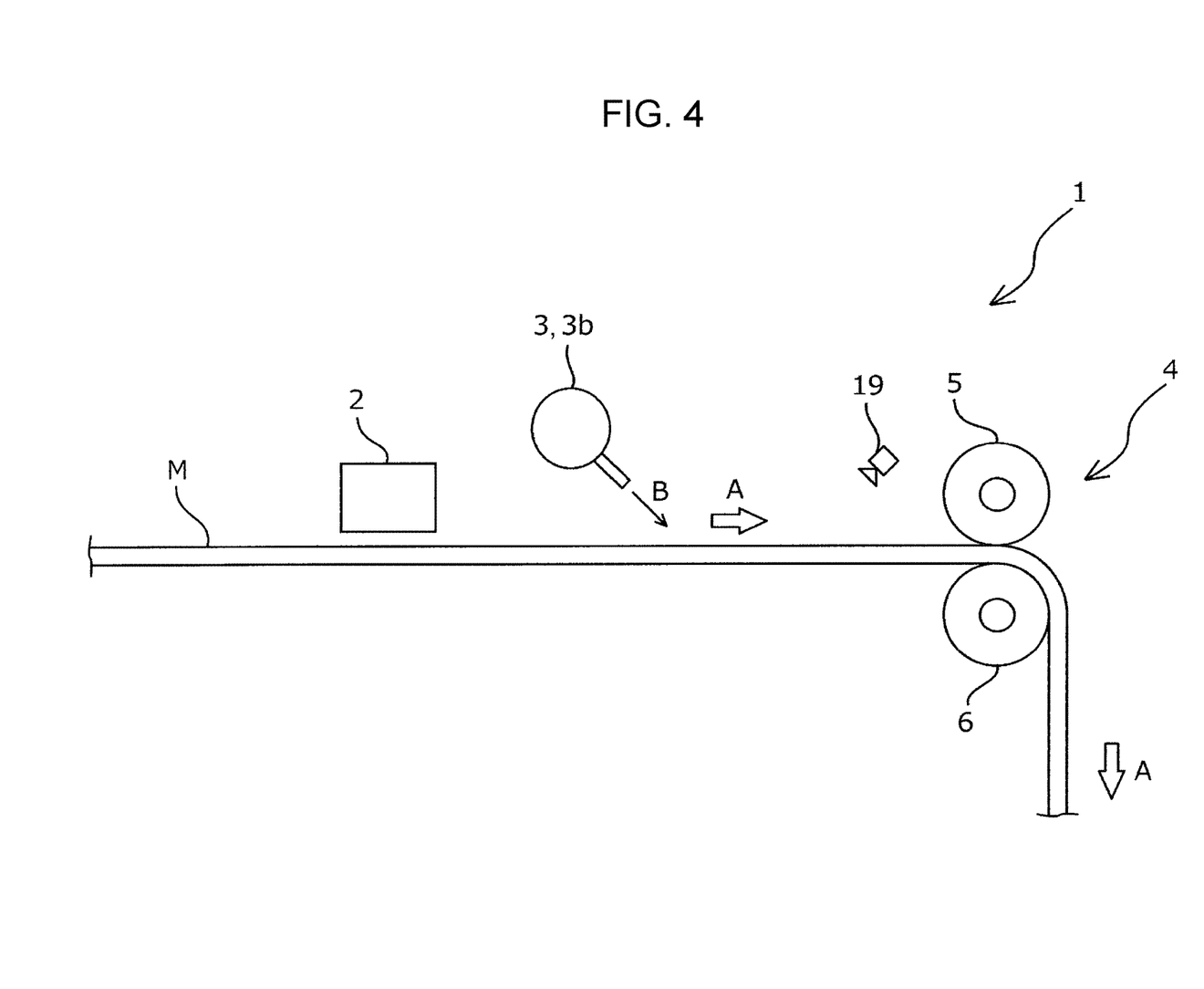
FIG. 4 is a schematic view of a recording apparatus according to a second embodiment of the invention.

Second Embodiment (FIG. 4)

Next, a recording apparatus of a second embodiment will be described in detail with reference to the accompanying drawings. FIG. 4 is a schematic view illustrating the recording apparatus 1 of the present embodiment and is a diagram corresponding to FIG. 1 of the recording apparatus 1 of the first embodiment. The constituent members in common with those in the above first embodiment is provided with the same numerals, and detailed description thereof will be omitted. Note that the recording apparatus 1 of the present embodiment is the same as the recording apparatus 1 of the first embodiment except for the configuration of the heating drying portion 3.

As illustrated in FIG. 4, the heating drying portion 3 in the recording apparatus 1 of the present embodiment is a heated air blower 3b which dries the thermoplastic medium M by convective heating. The heated air blower 3b here is configured to heat air on the inside thereof and blows the heated air toward the thermoplastic medium M in a direction B. With such a configuration, the recording apparatus 1 of the present embodiment can effectively dry the thermoplastic medium M by convective heating.

Figure 5:
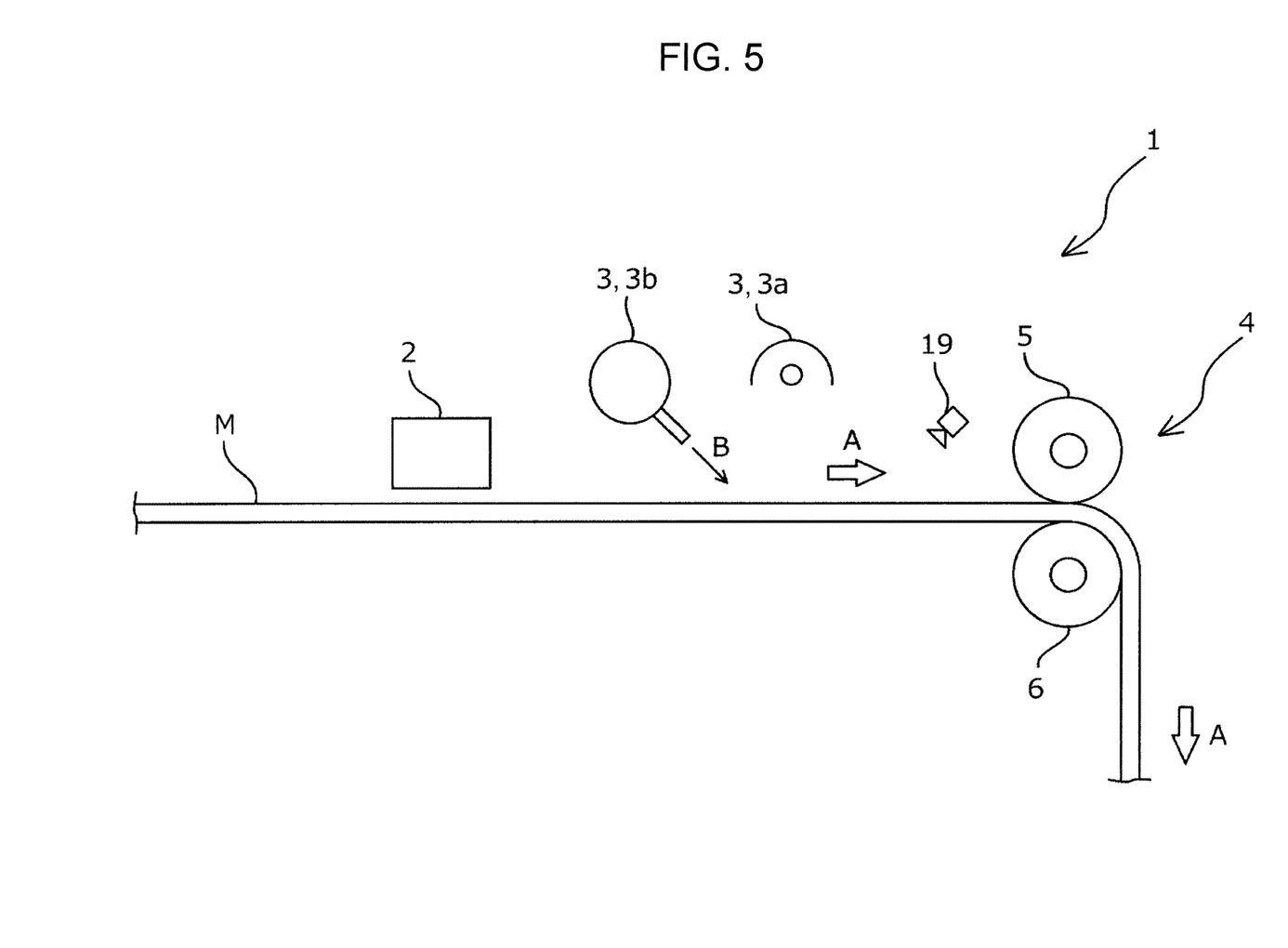
FIG. 5 is a schematic view of a recording apparatus according to a third embodiment of the invention.

Third Embodiment (FIG. 5)

Next, a recording apparatus of a third embodiment will be described in detail with reference to the accompanying drawings. FIG. 5 is a schematic view illustrating the recording apparatus 1 of the present embodiment and is a diagram corresponding to FIG. 1 of the recording apparatus 1 of the first embodiment. The constituent members in common with those in the above first embodiment are provided with the same numerals, and detailed description thereof will be omitted. Note that the recording apparatus 1 of the present embodiment is the same as the recording apparatus 1 of the first embodiment except for the configuration of the heating drying portion 3.

As illustrated in FIG. 5, the heating drying portion 3 in the recording apparatus 1 of the present embodiment includes both the infrared radiation portion 3a which dries the thermoplastic medium M in the recording apparatus 1 of the first embodiment by radiant heating and a heated air blower 3b which dries the thermoplastic medium M in the recording apparatus 1 of the second embodiment by convective heating. With such a configuration, it is possible to particularly and effectively heat and dry the thermoplastic medium M onto which recording has been performed by the recording head 2.

The invention is not limited to the above embodiments, but can be modified within the scope of the invention recited in the claims, and needless to say, such modifications are also included in the scope of the invention.

This application claims priority under 35 U.S.C. § 119 to Japanese Patent Application No. 2017-030767, filed Feb. 22, 2017. The entire disclosure of Japanese Patent Application No. 2017-030767 is hereby incorporated herein by reference.

What is claimed is:

1. An apparatus, comprising:
a heating drying portion that heats and dries a thermoplastic medium to which a liquid has been applied, wherein the heating drying portion is located downstream in a transportation direction of the thermoplastic medium of an ejection head that ejects the liquid onto the thermoplastic medium; and
a pressurizing portion that is separate from the heating drying portion and that pressurizes the thermoplastic medium heated by the heating drying portion to correct a shape of the thermoplastic medium, wherein the pressurizing portion pressurizes, while heating, the heated thermoplastic medium.

2. The apparatus according to claim 1, wherein the pressurizing portion has a roller and is able to change a heating temperature in each portion of the roller different in an axial direction of the roller.

3. The apparatus according to claim 2, wherein the roller is able to change the heating temperature at a center portion and end portions in the axial direction.

4. The apparatus according to claim 2, wherein in the roller, an external diameter of the center portion in the axial direction is larger than an external diameter of the end portions in the axial direction.

5. The apparatus according to claim 1, further comprising a determination unit that determines extension of the thermoplastic medium heated by the heating drying portion, for each region of the thermoplastic medium, wherein
the pressurizing portion pressurizes a region with less extension in the heated thermoplastic medium at a heating temperature higher than a temperature at which a region with more extension in the heated thermoplastic medium is pressurized.

6. The apparatus according to claim 5, wherein the pressurizing portion pressurizes the region with less extension while heating the region with less extension at a temperature equal to or higher than a glass transition temperature of the thermoplastic medium.

7. The apparatus according to claim 5, wherein the pressurizing portion pressurizes the region with more extension while heating the region with more extension at a temperature lower than a glass transition temperature of the thermoplastic medium.

8. The apparatus according to claim 1, wherein the heating drying portion dries the thermoplastic medium by radiant heating.

9. The apparatus according to claim 1, wherein the heating drying portion dries the thermoplastic medium by convective heating.

10. A recording apparatus, comprising:
a recording head capable of discharging ink as the liquid onto the thermoplastic medium; and
the apparatus according to claim 1.

11. A recording apparatus, comprising:
a recording head capable of discharging ink as the liquid onto the thermoplastic medium; and
the apparatus according to claim 2.

12. A recording apparatus, comprising:
a recording head capable of discharging ink as the liquid onto the thermoplastic medium; and
the apparatus according to claim 3.

13. A recording apparatus, comprising:
a recording head capable of discharging ink as the liquid onto the thermoplastic medium; and
the apparatus according to claim 4.

14. A recording apparatus, comprising:
a recording head capable of discharging ink as the liquid onto the thermoplastic medium; and
the apparatus according to claim 5.

15. A recording apparatus, comprising:
a recording head capable of discharging ink as the liquid onto the thermoplastic medium; and
the apparatus according to claim 6.

16. A recording apparatus, comprising:
a recording head capable of discharging ink as the liquid onto the thermoplastic medium; and
the apparatus according to claim 7.

17. A recording apparatus, comprising:
a recording head capable of discharging ink as the liquid onto the thermoplastic medium; and
the apparatus according to claim 8.

18. A recording apparatus, comprising:
a recording head capable of discharging ink as the liquid onto the thermoplastic medium; and
the apparatus according to claim 9.

19. A drying method, comprising:
heating and drying a thermoplastic medium to which a liquid has been applied by a heating and drying portion that is located downstream in a transportation direction of the thermoplastic medium of an ejection head that ejects the liquid onto the thermoplastic medium; and
pressurizing by a pressurizing portion that is separate from the heating drying portion the thermoplastic medium heated in the heating and drying to correct a shape of the thermoplastic medium,
wherein the pressurizing pressurizes, while heating, the heated thermoplastic medium.

* * * * *